United States Patent [19]
Lau et al.

[11] Patent Number: 5,504,684
[45] Date of Patent: Apr. 2, 1996

[54] SINGLE-CHIP GPS RECEIVER DIGITAL SIGNAL PROCESSING AND MICROCOMPUTER

[75] Inventors: Chung Y. Lau, Sunnyvale; Kreg A. Martin, Cupertino; Gary W. Lake, Mountain View, all of Calif.

[73] Assignee: Trimble Navigation Limited, Sunnyvale, Calif.

[21] Appl. No.: 165,972

[22] Filed: Dec. 10, 1993

[51] Int. Cl.⁶ ............................... H04B 7/185; G01S 5/02
[52] U.S. Cl. .................. 364/443; 364/449; 364/490; 340/988; 342/357; 342/451; 342/463; 455/3.2
[58] Field of Search .................... 364/443, 449, 364/490, 491; 340/988, 989; 342/352, 357, 450, 457, 451, 463, 464, 465; 455/3.2, 314

[56] References Cited

U.S. PATENT DOCUMENTS

| | | | |
|---|---|---|---|
| 5,075,693 | 12/1991 | McMillan et al. | 342/457 |
| 5,117,232 | 5/1992 | Cantwell | 342/357 |
| 5,175,557 | 12/1992 | King et al. | 342/357 |
| 5,202,693 | 4/1993 | Lee | 342/357 |
| 5,225,842 | 7/1993 | Brown et al. | 342/357 |
| 5,266,958 | 11/1993 | Durboraw, III | 342/357 |
| 5,303,393 | 4/1994 | Noreen et al. | 455/3.2 |
| 5,311,149 | 5/1994 | Wagner et al. | 455/314 X |

*Primary Examiner*—Collin W. Park
*Attorney, Agent, or Firm*—Law Offices of Thomas E. Schatzel

[57] ABSTRACT

An embodiment of the present invention combines, on a single integrated circuit, an eight channel GPS receiver, a 68330-type microprocessor, a 68681-type DUART serial communications controller, an analog-to-digital converter, a real-time clock, a random access memory and a boot read-only memory. A system integration module and inter-module bus allow tri-state control of the microprocessor such that a commercially available 68332-type emulator may be used for software development.

11 Claims, 3 Drawing Sheets

SINGLE-CHIP GPS RECEIVER DIGITAL SIGNAL PROCESSING AND MICROCOMPUTER

BACKGROUND OF THE INVENTION

1. Field of the Invention

The invention relates generally to integrated circuit semiconductor devices and more specifically to highly integrated implementations of global positioning system receivers.

2. Description of the Prior Art

The retail price of complete global positioning system (GPS) receivers including hand-held, battery-operated portable systems, continues to decrease. Competitive pressures drive manufacturers to reduce manufacturing costs while maintaining or actually improving functionality and reliability. Semiconductor fabrication advances have provided a vehicle to meet such goals, and to offer still smaller devices.

With a highly-integrated GPS receiver implementation, it is desirable to incorporate a GPS receiver's digital signal processing circuitry with a microcomputer with its associated peripherals, e.g., real time clock, serial input/output controllers, analog-to-digital converters, et cetera. In conventional GPS receivers, circuitry for digital signal processing and an associated microprocessor are separate, discrete devices mounted to one or more printed circuit boards.

SUMMARY OF THE PRESENT INVENTION

It is therefore an object of the present invention to provide an integrated circuit for reducing the size, cost and complexity of a GPS receiver and thus improve reliability and performance.

Another object of the present invention is to provide a single integrated circuit device that integrates much of the digital functions associated with navigation and GPS satellite signal processing.

Briefly, an embodiment of the present invention combines on a single integrated circuit an eight channel GPS receiver, a 68330-type microprocessor, a 68681-type DUART serial communications controller, an analog-to-digital converter, a real-time clock, a random access memory and a boot read-only memory. A system integration module and inter-module bus allow tri-state control of the microprocessor such that a commercially available 68332-type emulator may be used for software development.

An advantage of the present invention is that a single-chip GPS digital integrated circuit is provided that has substantially lower system power consumption, compared to the prior art, because the data bus lines between the DSP and micro-controller functional units are internal and therefore very lightly loaded with parasitic capacitances. Thus, much smaller buffers can be used to interface between the various functional blocks.

Another advantage of the present invention is that a single-chip GPS digital integrated circuit is provided that has a much lower part count, compared to the prior art. Peripheral circuitry such as a real-time clock, a universal asynchronous receiver/transmitter, analog-to-digital converter, etc., which usually comprise discrete packages, are all combined into a single device. Therefore, packaging cost is lowered and smaller PC board space requirements are the result.

A further advantage of the present invention is that a single-chip GPS digital integrated circuit is provided that has improved reliability, where fewer packages and fewer interface circuitry and lower power dissipation translate directly into improved reliability.

Another advantage of the present invention is that a GPS digital integrated circuit is provided that has significant system cost savings. The resulting single-chip costs much less than the sum of the parts it replaces.

A still further advantage of the present invention is that a single-chip GPS digital integrated circuit is provided that is susceptible to integrated circuit process improvements.

A further advantage of the present invention is that a single-chip GPS digital integrated circuit is provided in which all the functions on the integrated circuit are fabricated using an advanced integrated circuit process that yields an increase in performance. Such performance is not otherwise attainable with separate commercially-available discrete parts, because such prior art devices are typically more mature products and fabricated with older processes.

Another advantage of the present invention is that a GPS digital integrated circuit is provided that can be re-scaled to take full advantage of the benefits of continuing process improvements in the art of semiconductor fabrication. Examples of such advantages are higher operating clock speed, lower power consumption, low supply voltage operation, lower price due to smaller die size, etc. Every function on the integrated circuit can be expected to participate in these benefits.

Another advantage of the present invention is that a single-chip GPS device is provided that is small in size.

Another advantage of the present invention is that a single-chip GPS digital integrated circuit is provided that can operate on a single three volt power supply.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
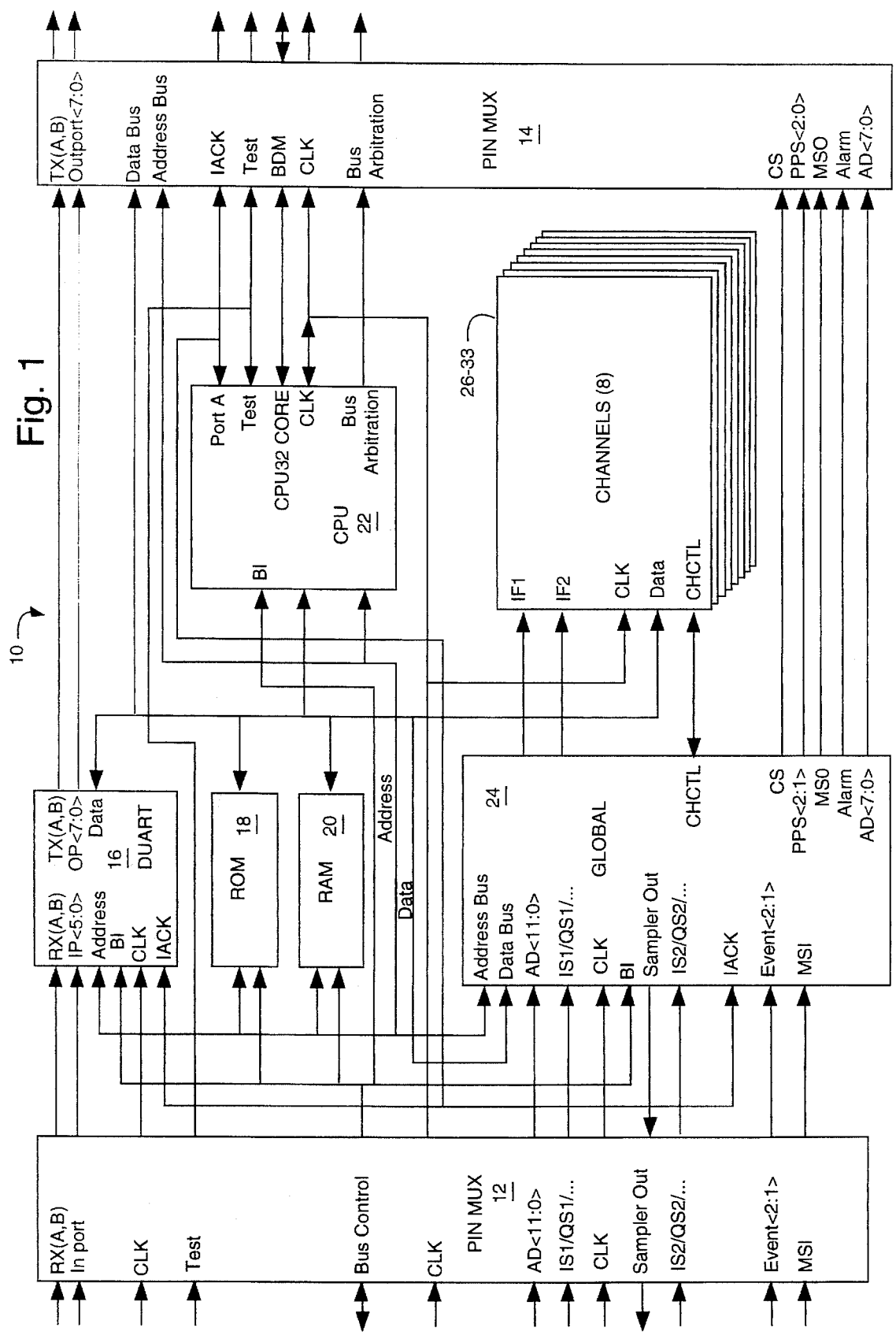
FIG. 1 is a block diagram of a GPS digital integrated circuit embodiment of the present invention.
Figure 2:
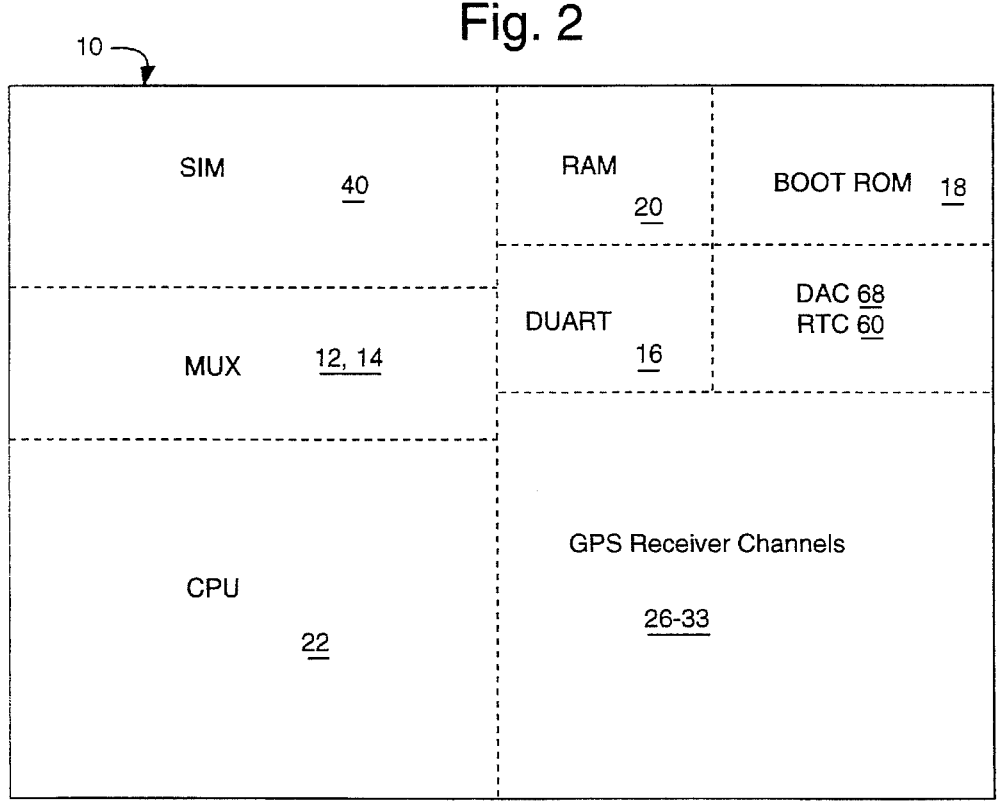
FIG. 2 is a general layout in plan view of the semiconductor chip of FIG. 1.

FIG. 1 illustrates a GPS digital integrated circuit (IC) embodiment of the present invention, referred to herein by the general reference numeral 10. The IC 10 carries out the digital processing aspects of a GPS navigation system, including GPS code correlation and position and velocity calculation, local oscillator frequency synthesis, user keyboard and display interfacing, and other digital signal processing (DSP) and input/output (I/O) functions. IC 10 is implemented on a single semiconductor chip which may be physically laid out and fabricated on the surface of a silicon substrate, as shown in FIG. 2. Commercial standard-cell high-performance computer-core CMOS semiconductor fabrication processes and packaging facilities available in the United States, such as provided by Motorola Semiconductor (Phoenix, Ariz.), may be successfully used to build IC 10. IC 10 is preferably implemented using a commercially available semiconductor fabrication technology such as advanced, triple-metal, 0.8 micron CMOS processes directed at high performance and low power consumption. A 144-pin thin plastic quad flat-pack (TQFP) is preferably used to package IC 10.

FIG. 1 shows that IC 10 comprises a pair of IC pin multiplexers 12 and 14, a dual universal asynchronous receiver transmitter (DUART) 16, a read only memory (ROM) 18, a random access memory (RAM) 20, a microcomputer (CPU) 22, a global channel controller 24 and a set of eight GPS receiver channels 26–33 for demodulating carrier signals simultaneously received from a plurality of orbiting GPS satellites.

IC pin multiplexers 12 and 14 make it possible for a 144-pin TQFP package to contain IC 10. Since not all input/output signals associated with IC 10 need to be simultaneously available to the external interface, some pins are configurable to serve more than one function.

The use of standard cell devices can substantially simplify the task of implementing IC 10. DUART 16 is preferably a standard cell device, for example the Motorola 68681 DUART. CPU 22 is also preferably a standard cell device, for example the Motorola 68330 microcomputer, which is integrated into the substrate of IC 10. DUART 16 is also integrated into the substrate of IC 10. As a consequence, these and all the other functional elements of IC 10 share a common semiconductor fabrication process and are susceptible to process improvements and scaling on a substantially equal basis. Since such elements within IC 10 constitute a major part of the whole function of a complete GPS navigation system, such semiconductor process improvements will operate on a system-wide basis. Therefore piecemeal improvements are avoidable over a product life and little inertia exists to retain older, less advanced components in a system. Due to the common basis of fabrication of the elements of IC 10 on a single-chip, operation from a single power supply voltage is obtainable. A single three volt supply is therefore preferably used for all the functions, including analog to digital conversion. (Prior art ADC's seldom use three volt supplies.)

GPS receiver channels 26–33 are independent coarse acquisition (C/A) code GPS receiver channels. For example, a conventional GPS receiver that has been adapted to standard-cell integrated circuit fabrication techniques can provide good results when used to implement channels 26–33.

During acquisition and tracking of a particular GPS satellite vehicle (SV), IC 10 is operated to find a Doppler influenced GPS carrier frequency and C/A code phase from the GPS SV. As is conventional, a GPS receiver will search over a range of frequencies, a range that can be widened by local oscillator uncertainties when first starting up. A range of 1023 code phases will also be searched (chip-by-chip) until a signal from the expected GPS SV is found. If the expected GPS SV is not found, C/A codes for other likely candidate satellite vehicles are tried. This search is carried out by mixing a received signal with various local oscillator frequencies in a super-heterodyne configuration and correlating a detected signal with a trial C/A code that is predicted to be valid for the locale. The correlation interval is typically one millisecond, which is the periodicity of the C/A code.

After an initial detection of a GPS signal, a phase locked loop is used to help bring it in to a full track condition. The success of the phase locked loop and the phase locked loop delay are dependent upon bringing the signal close enough to a pseudo-baseband via a carrier numerically controlled oscillator (NCO), and being close enough to an actual peak in C/A code phase.

After a GPS receiver acquires a satellite signal, it may temporarily lose lock due to some physical obstruction between the receiver and the satellite, e.g. the user drives by a very tall building. Rather than resuming a search over a range of code phases, it is possible to use information from the last lock to predict the new code phase. This makes for fast re-acquisition once the obstruction is out of the way. However, such concerns and their solutions are conventional and well documented in the background art which a person skilled in the art will be conversant.

Intermediate frequency signals from an external radio frequency (RF) and mixer stage are received at a pair of differential inputs IF1 and IF2, each of which is a two-bit quantized quadrature input. A multiplexer function within IC 10 allows several different types of IF signal inputs to be accommodated by IC 10. In a normal mode, the IF1 and IF2 inputs are directly available. In a sampler mode, IF1 and IF2 are directed to a sampler circuit. In a gyro mode, such as used in inertial instrumentation, two single-bit inputs are steered to the sampler circuit and two additional inputs connect to a pair of gyro sampler flip-flops. In a fourth mode, a sign input and two magnitude inputs to the sampler are accepted, together with a sampler clock, which can either be driven internally, or-externally. A set of four channel test outputs for IC 10 are provided: CHT1A, CHT1B, CHT2A and CHT2B.

A set of eleven chip select outputs, CS0–CS10, are provided for connecting to external memory and peripheral chips and for reducing the need for external "glue" logic to interface IC 10.

A sixteen-bit bi-directional data bus, DB0–DB15, is multiplexed into the thirty-two bits of CPU 22. The least significant nineteen bits of the address bus from CPU 22 are brought out as an address bus A0–A18. Address lines A19–A31 internal to IC 10 are distributed normally, but are multiplexed with various other functions to save package pins when brought out externally. The data transfer direction for a current cycle is indicated by a read/not-write control signal, R/W. RMC is an output that signals a read-modify-write cycle. An address strobe, AS, is used by external devices to latch address information from A0–A31. A data strobe, DS, signals when data is valid on DB0–DB15. A pair of active-LOW upper byte and lower byte write strobes, UWE and LWE, are used for byte-wide data transfers. A read strobe, RD, latches in read data. A dynamic bus sizing is implemented with a pair of signals, SIZ0 and SIZ1. Data strobe acknowledge signals, DACK0 and DACK1, are used to terminate an access cycle and are used for dynamic bus sizing. An active LOW boot chip select output, CSB, is derived from CPU 22. A boot code program running in ROM 14 typically causes this output to select an external memory that may contain a custom initialization code. A chip select, CSX, enables access to a set of internal registers and memories that are not part of the core of CPU 22.

The data bus lines between the functional units of IC 10, e.g., DB0–DB15, are internal and therefore very lightly loaded with parasitic capacitances. Thus, much smaller buffers can be used to interface between the various functional blocks. In a discretely implemented prior art system having nearly the same functions as IC 10, these same interfaces would unavoidably go off-chip and encounter as much as fifty picofarads of capacitance per line that would have to be overcome by suitable buffer/drivers.

An autovector input, AVEC, is provided to CPU 22 that will cause an interrupt vector address to be loaded in the CPU address register when a hardware signal is received. The AVEC function can also be generated automatically. A chip select output controlled by a register external to the core of CPU 22 is labeled CS0. When other masters wish to use the address and data buses, a bus request input, BR, is received from the requester. BG is a bus grant output. BGACK is a bus grant acknowledge input.

Interrupt acknowledges, corresponding to levels zero through seven are received on lines labeled IACK0–IACK7. A pair of ports, with bit lines labeled PORT A0–PORT A7 and PORT B0–PORT B7, are provided for general-purpose input and output. One or more lines of PORT B can be configured by software running on CPU 22 to be either push/pull, or simply open-drain for external pull-up. The PORT A and B input/output signals are able to support direct scanning of an external keyboard, thereby eliminating additional external buffers or diodes.

IC 10 can assert an interrupt request GPSIRQ. A response signal, GPSIACK, is an interrupt acknowledge signal that causes IC 10 to drive an interrupt vector onto DB0–DB15. DUART 16 receives an interrupt acknowledge from a signal output from CPU 22 which is labeled DRTIACK and is also made available externally. DRTIACK causes DUART 16 to drive an interrupt vector onto DB0–DB15.

Memory protector 18 provides for external battery-backed CMOS static RAMs. An external signal pin is pulled HIGH by the standby power supply (VSTBY) whenever a memory protect signal input, MPROT, is HIGH. Chip selects CS3 and CS4 are used for CMOS memory selection in such instances.

A combination power-up hardware reset output from IC 10 and reset input for all blocks is provided by a signal labeled RESET. CPU 22 may be halted by an input labeled HALT and produces a halt output in response.

Bus transfer errors are signaled to CPU 22 with an input labeled BERR. Eight interrupt request levels are provided with IRQ0–IRQ7. The source of a processor clock for CPU 22 can be specified by setting the logic state of an input signal, MODCK, at reset.

An external 32.768 KHz crystal can be connected to signal pins labeled XTAL and EXTAL to control internal oscillator 28. Alternatively, an externally supplied processor clock can be input at EXTAL. Phase-locked loop 21 is used to synthesize a number of internal frequency references for IC 10 from the XTAL/EXTAL source and has a connection provided for an external filter capacitor, labeled XFC. The processor clock has an external output, labeled CLKOUT.

Standby power supply, VSTBY, powers crystal oscillator 28, RTC 26 and the memory protect circuit 18. Power for the processor clock generator phase-locked loop frequency synthesizer circuit 21 is labeled, VCCSYN. When an output of RTC 26 is activated, an output, labeled ALARM, is pulled HIGH by the standby power supply (VSTBY). A tri-state control signal, TSC, when held LOW, puts IC 10 in a master mode in which CPU 22 is active and in control of the internal functional blocks and the external processor bus, e.g., DB0–DB15. When TSC is held HIGH, IC 10 is placed in a slave mode, in which CPU 22 is held in reset, and is effectively removed from participation in IC 10 functions. All dedicated CPU 22 output signals are tri-stated, while all other blocks remain active. This allows the assets of IC 10 to be accessed externally via the processor bus signals.

The state of an instruction fetch pipeline is communicated via two signal outputs from CPU 22, IPIPE and IFETCH. They also furnish data in and out signals for a background debug monitor for CPU 22. A breakpoint to CPU 22 is signaled with a signal labeled BKPT. CPU 22 acknowledges a breakpoint with a signal labeled FREEZE.

An Institute of Electronic and Electrical Engineers (IEEE) industry-standard number 1149.1-JTAG test function is provided with a set of four signals: TCK, TMS, TDI and TDO. EVENT1 and EVENT2 are event timer input signals. A millisecond generator toggle signal, TOGGLE, is used to identify in which millisecond an event or channel interrupt occurred.

A master clock input signal, MCLK, is provided to IC 10. This signal can be driven internally by CLKDVR 29, or it can be driven externally. An external millisecond input to IC 10 is provided as MSI. A millisecond generator output signal is labeled MSO.

PPS1 and PPS2 are general purpose pulse generator outputs. DAO0–DAO7 are outputs from a pulse-width modulator circuit. OP0–OP7 are labels for the individual bit lines of an output port signal from DUART 16. Output signal OP3 is capable of sourcing or sinking 48 mA, and can also be inverted or non-inverted. OP3–OP5 can be configured as push-pull outputs or an open-drain outputs.

The receive data input signals for the two DUART channels A and B are labeled RXD. The two transmit data output channels A and B are labeled TXD. Two DUART input port signals, IP0 and IP1, provide a clear-to-send (CTS) input function for the A and B channels in DUART 16. IP2 is a DUART input port signal that can also be used as an external clock input for the sixteen-bit counter/timer 26. A request-to-send (RTS) output function is also included for channels A and B of DUART 16. DUART 16 has a pair of crystal oscillator signals, X1 and X2. An external 3.6864 MHz crystal is connected for DUART 16 to operate a crystal oscillator. Alternatively, an external clock can be supplied to an input signal, CLK.

Table I lists a set of input/output interface pins preferably included with IC 10. A complete list of these input/output pins and their functions are summarized. Some of the signals shown individually in FIG. 1 are shown as sharing package pins with other signals. This sharing conserves the number of total pins required and does not unduly constrain the connection of IC 10 into a larger system.

TABLE I

| Pin Descriptions | |
|---|---|
| DB0-DB15 | The sixteen-bit bidirectional data bus of CPU 22. |
| A0-A18 | The least significant nineteen bits of the address bus of CPU 22. |
| R/W | Read/write signal. |
| AS | Active-LOW address strobe. |
| DS | Active-LOW data strobe. |
| L7WE/ DSACK0S, UWE/ DSACK1 | In master mode, these are active-LOW upper byte and lower byte write strobes. In slave mode, these two pins can be tied to DSACK0 and DSACK1 to enable active deassertion of these signals. To disable active deassertion of DSACK0 and DSACK1 in slave mode, DSACK0S and DSACK1S are tied HIGH. |
| RD | Active-LOW read strobe. |
| SIZ0-SIZ1 | CPU 22 outputs used for dynamic bus sizing. |
| DSACK0- DSACK1 | Data strobe acknowledge signals used to terminate an access cycle and for dynamic bus sizing. |
| CSB | Active LOW boot chip select output. This signal is derived from the CPU 22 CS1 output. Boot code running in |

TABLE I-continued

Pin Descriptions

| | |
|---|---|
| | ROM 14 uses this output to select external memory that contains the initialization code. |
| CSX/<br>FC2/<br>AVEC | This pin has three selectable functions. CSX is an active-LOW chip select that enables access of all internal registers and memories that are not part of the core of CPU 22. In a master mode, this signal is derived from CS0 output of CPU 22 and can be used to signal external logic or to signal an emulator that internal registers are being accessed. In a slave mode, this pin is a CSX input that enables an external access to IC 10. FC2 is a CPU function code output. AVEC is an active-LOW CPU auto-vector input, and may not be needed, where an AVEC function can be generated automatically. |
| CS0/<br>BR/<br>A31/<br>IACK7/<br>PORT A7 | This pin has five selectable functions. CS0 is a chip select output that is controlled by registers external to CPU 22. BR is an active-LOW bus request input. A31 is a high-order address line. IACK7 is an active-LOW priority level seven interrupt acknowledge output. PORT A7 is a general purpose port pin. |
| CS1/<br>BG/<br>A25/<br>IACK1/<br>PORT A1/<br>GPSIACK | In slave mode, this pin always has the GPSIACK function. This is an active-LOW interrupt acknowledge signal that causes IC 10 to drive an interrupt vector onto DB0-DB15. In master mode, this pin has one of five selectable functions. CS1 is an active-LOW chip select output that is derived from the CS2 output of CPU 22. BG is an active-LOW bus grant output. A25 is a high-order address line. IACK1 is an active-LOW priority level one interrupt acknowledge output. PORT A1 is a general purpose port pin. |
| CS2/<br>BGACK/<br>A26/<br>IACK2/<br>PORT A2/<br>DRTIACK | In slave mode, this pin always has DUART 16 IACK function. This is an active-LOW interrupt acknowledge signal that causes DUART 16 to drive an interrupt vector onto DB0-DB15. In a master mode, this pin has one of four selectable functions. CS2 is an active-LOW chip select output that is derived from the CPU 22 CS3 output. BGACK is an active-LOW bus grant acknowledge input. A26 is a high-order address line. IACK2 is an active-LOW priority level 2 interrupt acknowledge output. PORT A2 is a general purpose port pin. |
| CS3/<br>FC0/<br>A27/<br>IACK3/<br>PORT A3 | This pin has five selectable functions. CS3 is a chip select output that is controlled by registers external to the core of CPU 22. FC0 is one of the CPU 22 function code outputs. A27 is a high-order address line. IACK3 is an active-LOW priority level 3 interrupt acknowledge output. This pin is pulled HIGH by the standby power supply (VSTBY) whenever the MPROT input is HIGH. This provides a memory protect function when CS3 is used to select battery-backed CMOS static RAMs. PORT A3 is a general purpose port pin. |
| CS4/ | This pin has five selectable |
| FC1/<br>A30/<br>IACK6<br>PORT A6 | functions. CS4 is a chip select output that is controlled by registers external IACK6/ to the core of CPU 22. FC1 is one of the CPU 22 function code outputs. A30 is a high order address line. IACK6 is an active-LOW priority level 6 interrupt acknowledge output. This pin is pulled HIGH by the standby power supply (VSTBY) whenever the MPROT input is HIGH. This provides a memory protect function when CS4 is used to select battery-backed CMOS static RAMS. PORT A6 is a general purpose port pin. |
| CS6/<br>A19 | This pin has two selectable functions. CS6 is a chip select output that is controlled by registers external to the core of CPU 22. A19 is an address bus output. |
| CS7/<br>A20 | This pin has two selectable functions. CS7 is a chip select output that is controlled by registers external to the core of CPU 22. A20 is an address bus output. |
| CS8/<br>A21 | This pin has two selectable functions. CS8 is a chip select output that is controlled by registers external to the core of CPU 22. A21 is an address bus output. |
| CS9/<br>A22 | This pin has two selectable functions. GS9 is a chip select output that is controlled by registers external to the core of CPU 22. A22 is an address bus output. |
| CS10/<br>A23 | This pin has two selectable functions. CS10 is a chip select output that is controlled by registers external to the core of CPU 22. A23 is an address bus output. |
| RESET | Active-low power-up reset output and external rese input for all blocks. |
| HALT/<br>IP2/<br>AD0 | This pin has three selectable functions. HALT is the CPU 22 halt input and output. IP2 is a DUART input port pin that can also be used as the external clock input for the sixteen-bit counter/timer. This pin also serves as an AD0 synchronized analog-to-digital conversion input. |
| BERR | Active-LOW bus error input. |
| IRQ1/<br>PORT B1/<br>AD1 | Active-LOW interrupt priority level one input. This pin can also be configured as general purpose port pin B1. As an output port pin, it can be configured to be either a push-pull output or an open-drain output. This pin also serves as an AD1 synchronized analog-to-digital conversion input. |
| IRQ2/<br>PORT B2/<br>AD2 | Active-LOW interrupt priority level 2 input. This pin can also be configured as general purpose port pin B2. As an output port pin, it can be configured to be either a push-pull output or an open-drain output. This pin also serves as an AD2 synchronized analog-to-digital conversion input. |
| IRQ3/<br>PORT B3/<br>AD3 | Active-LOW interrupt priority level 3 input. This pin is also pulled LOW by an active DUART interrupt if DUART 16 is set to interrupt on priority level 3. This pin can also be configured as general purpose port pin B3. As an output port pin, it can be configured to be either a push-pull output or an |

TABLE I-continued

Pin Descriptions

| | |
|---|---|
| | open-drain output. This pin also serves as an AD3 synchronized analog-to-digital conversion input. |
| IRQ4/ GPSIRQ/ PORT B4/ AD4 | Active-LOW interrupt priority level 4 input. This pin GPSIRQ/ is also pulled LOW by an active IC 10 interrupt. This pin can also be configured as general purpose port pin B4. As an output port pin, it can be configured to be either a push-pull output or an open-drain output. This pin also serves as an AD4 synchronized analog-to-digital conversion input. |
| IRQ5/ PORT B5/ AD5 | Active-LOW interrupt priority level 5 input. This pin is also pulled LOW by an active DUART interrupt if DUART 16 is set to interrupt on priority level 5. This pin can also be configured as general purpose port pin B5. As an output port pin, it can be configured to be either a push-pull output or an open-drain output. This pin also serves as an AD5 synchronized analog-to-digital conversion input. |
| IRQ6/ TIRQ/ PORT B6/ AD6 | Active-LOW interrupt priority level 6 input. This pin can be pulled LOW by an activated timer interrupt within DUART 16 if this function is enabled. This pin can also be configured as general purpose port pin B6. As an output port pin, it can be configured to be either a push-pull output or an open-drain output. This pin also serves as an AD6 synchronized analog-to-digital conversion input. |
| IRQ7/ PORT B7/ AD7 | Active-LOW interrupt priority level seven input. This pin can also be configured as general purpose port pin B7. As an output port pin, it can be configured to be either a push-pull output or an open-drain output. This pin also serves as an AD7 synchronized analog-to-digital conversion input. |
| MODCK/ PORT B0/ ECLKO | The logic state of this input pin at reset determines the source of the processor clock. This pin can also be configured as general purpose port pin B0. As an output port pin, it can be configured to be either a push-pull output or an open-drain output. This pin can also be configured as the "E-clock" output for 68000-style peripherals. |
| EXTAL, XTAL | These two pins can be connected to an external 32.768 MHz crystal. alternatively, EXTAL is the input pin for an externally supplied processor clock. |
| XFC | Connection pin for an external filter capacitor for the processor clock generator phase-locked loop. |
| CLKOUT/ PCLK | Output pin for the processor clock. In slave mode, this pin is the PCLK input for a chip select (CS) logic wait-state generator. |
| ALARM | This output is pulled HIGH by the standby power supply (VSTBY) when the alarm output of RTC 26 goes active. |
| MPROT | When this input is pulled HIGH, the CS3 and CS4 pins are pulled HIGH by the standby power supply (VSTBY). |
| VSTBY | The standby power supply (VSTBY) input pin. This pin powers the 32.768 KHz crystal oscillator, RTC 26, and the memory protect circuit 18. |
| VCCSYN | This power pin supplies power to a processor clock generator phase-locked loop circuit. |
| TSC | Tri-state control pin. When this pin is held LOW, IC 10 is in master mode. The CPU 22 is active and controls the internal blocks and the external processor bus. When this pin is held HIGH, IC 10 is in slave mode, CPU 22 core is held in reset and effectively removed from the system. All dedicated CPU 22 output pins are tri-stated. All other blocks are still active, and can be accessed externally via the processor bus pins. |
| BKPT/SE | This active-LOW input signals a breakpoint to the CPU 22. When IC 10 is in test mode, this is the scan enable input |
| IPIPE, IFETCH | These two pins are outputs from the CPU 22 that indicate the state of the instruction fetch pipeline. They also furnish data in and out pins for the CPU 22 background debug monitor. |
| FREEZE | This active-LOW output indicates that the CPU 22 has acknowledged a breakpoint. |
| IS1/C8, QS1/C9, IM1/C10, QM1/C11 | These four pins are the two-bit quadrature IF input pins for a first IF input. These pins provide different functions, depending on the mode setting of the IF input circuitry. In a first mode, these pins provide the IF1 inputs directly. In a second mode, they serve as inputs to the sampler. In a third mode, IS1 and IM1 are two single-bit inputs to the sampler and QS1 and QM1 are inputs to two gyro input sampler flip-flops. In a fourth mode, QS1 is the sign input to the sampler, IM1 and QM1 are the two magnitude inputs, and IS1 is not used. These four pins can also be read out as bits 8–11 of port "C" |
| IS2/C12, QS2/C13, IM2/C14/ AD10, QM2/C15/ AD11 | These four pins are the two-bit quadrature IF input pins for a second IF input. Depending on the mode setting of the IF input circuitry, these pins provide different functions. In the first mode, these pins provide the IF2 inputs directly. In the second and fourth modes, they serve as outputs from the sampler. In the third mode, these four pins provide the inverted and non-inverted outputs from the two gyro input sampler flip-flops. These four pins can also be read out as bits 12–15 of port "C". The IM2 and QM2 pins also serve as the AD10 and AD11 synchronized analog-to-digital conversion inputs. |
| XCLX/ IP3 | This is the clock input pin to the CLKDVR clock prescaler/driver circuit. This circuit can be used to provide the master and sample clocks when operating in Titan mode. This pin also provides the IP3 input port signal to DUART 16. |
| MCLK | This is the master clock input pin to IC 10. This pin can be driven internally by CLKDVR 29, or it can be driven externally. |
| SCLK | This is a sample clock input pin. It can either be driven internally by a |

TABLE I-continued

Pin Descriptions

| | |
|---|---|
| | CLOCKDVR circuit, of externally by another IC 10 or similar source. |
| MSI/IP4/ AD8 | The external millisecond input to IC 10. This pin also provides the IP4 input port signal to DUART 16. This pin also serves as an AD8 synchronized analog-to-digital conversion input. |
| MSO TOGGLE/ IP5/ PWAIT | The millisecond generator output pin. This is the millisecond generator toggle signal, that is used to determine during that millisecond an event or channel interrupt occurred. This pin also provides the IP5 input port signal to the DUART 16. After reset, a bootstrap program running in CPU 22 preferably examines the state of this pin. If LOW, CPU 22 waits an additional 100 milliseconds before accessing external memory. |
| EVENT1/ C0/TD0 | The event timer-one input pin. This pin is also provides a TD0 bit which is used to specify the test mode when the TESTEN pin goes HIGH. |
| EVENT2/ C1/TD1 | The event timer-two. input pin. This pin can also be read as bit one of port "C". This pin is also provides a TD1 bit which is used to specify the test mode when the TESTEN pin goes HIGH. |
| PPS1/RMC/ RINGOSC | This pin has three selectable functions. PPS1 is the general purpose pulse generator-one output. RMC is an active-LOW read-modify-write cycle output. RINGOSC is the output of a ring oscillator included in chip 10. |
| PPS2/OP2/ AD9/C2/ MONITOR | This pin has three selectable functions. PPS2 is the general purpose pulse generator-two output. OP2 is an output port signal from DUART 16. This output pin can be configured as either push-pull or open-drain. This pin also serves as the AD9 synchronized analog-to-digital conversion input and can be read as bit two of port "C". After reset, a bootstrap program running in CPU 22 preferably examines the state of this pin. If LOW, CPU 22 is directed to jump directly to a boot monitor program without accessing external memory. |
| DA00/A24/ PORT A0 | This pin has three selectable functions. DA00 is an output from the pulse-width modulator circuit. A24 is a high-order address line. PORT A0 is a general purpose port pin. |
| DA01/A28/ IACK4/ PORT A4 | This pin has four selectable functions. DA01 is an output from the pulse-width modulator circuit. A28 is a high-order address line. IACK4 is an active-LOW priority level 4 interrupt acknowledge output. PORT A4 is a general purpose port pin. |
| DA02/A29/ IACK5/ PORT A5 | This pin has four selectable functions. DA02 is an output from the pulse-width modulator circuit. A29 is a high-order address line. IACK5 is an active-LOW priority level five interrupt acknowledge output. PORT A5 is a general purpose port pin. |
| DA03/OP3/ C3 | This pin has three selectable functions. DA03 is an output from the pulse-width modulator circuit. OP3 is an output port signal from DUART 16. This output pin is capable of sourcing or sinking forty-eight milliamps. It can be configured as a push-pull output or an open-drain output. It can also be inverted or non-inverted. This pin can be read as bit three of port "C". |
| DA04/OP4/ C4 | This pin has three selectable functions. DA04 is an output from the pulse-width modulator circuit. OP4 is an output port signal from DUART 16. This output pin is capable of sourcing or sinking forty-eight milliamps. It can be configured as a push-pull output or an open-drain output. This pin can be read as bit four of port "C". |
| DA05/OP5/ C5 | This pin has three selectable functions. DA05 is an output from the pulse-width modulator circuit. OP5 is an output port signal from DUART 16. This output pin is capable of sourcing or sinking forty-eight milliamps. It can be configured as a push-pull output or an open-drain output. This pin can be read as bit five of port "C". |
| DA06/OP6/ CHT2A/C6/ BSTAT0/ EXTCD0 | This pin has six selectable functions. DA06 is an output from the pulse-width modulator circuit. OP6 is an output port signal from DUART 16. CHT2A is a channel test output. This output pin can be configured as a push-pull output or an open-drain output. This pin can be read as bit six of port "C". Following a reset, the boot program may use this pin to output the boot status bit BSTAT0. EXTCD0 is the daisy-chained code output pin from the eight channel, channel 33. |
| DA07/OP7/ CHT2B/C7/ BSTAT1/ DCLK0 | This pin has three selectable functions. DA07 is an output from the pulse-width modulator circuit. OP7 is an output port signal from DUART 16. CHT2B is a channel test output. This output pin can be configured as a push-pull output or an open-drain output. This pin can be read as bit six of port "C". Following a reset, the boot program may use this pin to output the boot status bit BSTAT1. DCLK0 is the buffered output from a crystal oscillator in the DUART 16. |
| RXDA, RXDB | These are the receive data input pins for the two channels of DUART 16. |
| TXDA, TXDB | These are the transmit data output pins for the two channels of DUART 16 |
| IP0/SBOD, IP1 | These input port pins provide the clear-to-send (CTS) input function for the two channels of DUART 16. They can also be used as general purpose input port pins. In a scan test mode, the SBOD signal disables bi-directional output buffers within IC 10 |
| OP0/CHT1A | This pin has two selectable functions. OP0 can provide the RTS output function for channel A of DUART 16. It can also be used as a general purpose output pin. CHT1A is a IC 10 channel test output. |
| OP1/CHT1B | This pin has two selectable functions. OP1 can provide the RTS output function for channel B of DUART 16. It can also be used as a general purpose output pin. CHT1B is |

TABLE I-continued

Pin Descriptions

| | |
|---|---|
| | a IC 10 channel test output. |
| X1/CLK, X2 | These are crystal oscillator pins associated with DUART 16 for connection to an external 3.6864 MHz crystal. Alternatively, an external clock can be supplied to the X1/CLK input pin |
| TESTEN | This is an active-HIGH test enable pin and is normally tied LOW. |

The remaining pins are VCC and GND pins.

Table II lists the IC 10 pins that may be connected to an emulator for firmware development support, such as the Hewlett-Packard model 68332.

TABLE II

| 68332 pin | IC 10 Pin |
|---|---|
| DB0-DB15 | DB0-DB15 |
| A0–A8 | A0-A18 |
| CSBOOT | CSB |
| BR/CS0 | BR/CS0/A31/IACK7/PORT A7 |
| BG/CS1 | BG/CS1/A25/IACK1/PORT A1/GPSIACK |
| BGACK/CS2 | BGACK/CS2/A26/IACK2/PORT A2/DRTIACK |
| FC0/CS3 | FC0/CS3/A27/IACK3/PORT A3 |
| FC1/CS4 | FC1/CS4/A30/IACK6/PORT A6 |
| FC2/C55 | FC2/CSX/AVEC |
| A19/CS6 | A19/CS6 |
| A20/CS7 | A20/CS7 |
| A21/CS8 | A21/CS8 |
| A22/CS9 | A22/CS9 |
| A23/CS10 | A23/CS10 |
| DSACK0 | DSACK0 |
| DSACK1 | D |
| AVEC | — |
| RMC | PPS1/RMC |
| DS | DS |
| AS | AS |
| SIZ0 | SIZ0 |
| SIZ1 | SIZ1 |
| R/W | R/W |
| RESET | RESET |
| HALT | HALT/IP2 |
| BERR | BERR |
| MODCK | MODCK/PORT B0 |
| IRQ1 | IRQ1/PORT B1 |
| IRQ2 | IRQ2/PORT B2 |
| IRQ3 | IRQ3/PORT B3 |
| IRQ4 | IRQ4/GPSIRQ/PORT B4 |
| IEQ5 | IRQ5/PORT B5 |
| IRQ6 | IRQ6/PORT B6 |
| IRQ7 | IRQ7/PORT B7 |
| CLKOUT | CLKOUT |
| XTAL | — |
| EXTAL | EXTAL |
| XFC | — |
| VDDSYN | VCCSYN |
| TSTME/TSC | TSC (Via a Zener clamping circuit) |
| FREEZE/QOUT | FREEZE |
| IPIPE/DS0 | IPIPE |
| IFETCH/DSI | IFETCH |
| BKPT/DSCLK | BKPT |
| VSTBY | — |

As can be seen from Table I, several individual pins have more than one function. Of course, the selection of the functions that share a common pin cannot have conflicting interfacing requirements. Such pins are shared to reduce fabrication costs of the IC, its package and a printed circuit board. Certain pins further allow the optional use of IC 10 in a variety of GPS and navigational system applications. For example, depending on an IF mode setting, the four pins: IS1, QS1, IM1 and QM1, allow direct IF1 input in a normal mode and input sampling in a sampler mode. In a gyro mode, IS1 and IM1 are two single-bit style inputs to a sampler circuit, and QS1 and QM1 are inputs to a pair of gyro sampler flip-flops. In a signed-magnitude mode, QS1 is a sign input to a sampler, IM1 and QM1 are a pair of magnitude inputs to the sampler, and IS1 provides a sampler clock. IS1 can either be driven internally via CLKDVR 29, or externally by another device.

Similarly, the four pins: IS2, QS2, IM2 and QM2, provide the IF2 inputs directly, in normal mode. In sampler mode and signed-magnitude mode, these pins are outputs from the sampler circuit. They can be used to provide the sampled IF inputs to additional systems 10. In gyro mode, these four pins provide the inverted and non-inverted outputs from the two gyro sampler flip-flops.

A set of internal software registers within IC 10 and not a part of the CPU 22 core are program accessible. Such access stimulates a chip select (CSX) signal that is derived from a CS0 signal associated with CPU 22. Following a reset, the CSX address space is mapped to address 000, 0000H (as seen by CPU 22), to enable the fetching of a reset vector. The internal registers are mapped into the CSX address space according to Table III.

TABLE III

| | |
|---|---|
| ROM 8 | 0000–03FF |
| RAM 20 | 0800–09FF |
| DUART 16 | 0C00–0C1F |
| Channel 26 Registers | 1000–101F |
| Channel 27 Registers | 1000–101F |
| Channel 28 Registers | 1000–101F |
| Channel 29 Registers | 1000–101F |
| Channel 30 Registers | 1000–101F |
| Channel 31 Registers | 1000–101F |
| Channel 32 Registers | 1000–101F |
| Channel 33 Registers | 1000–101F |
| Registers for Channels 26–33 | 1C00–1C1F |
| Global Registers | 1E00–1E3F |
| CS Control Registers | 1F00–1F3F |

Figure 3C:
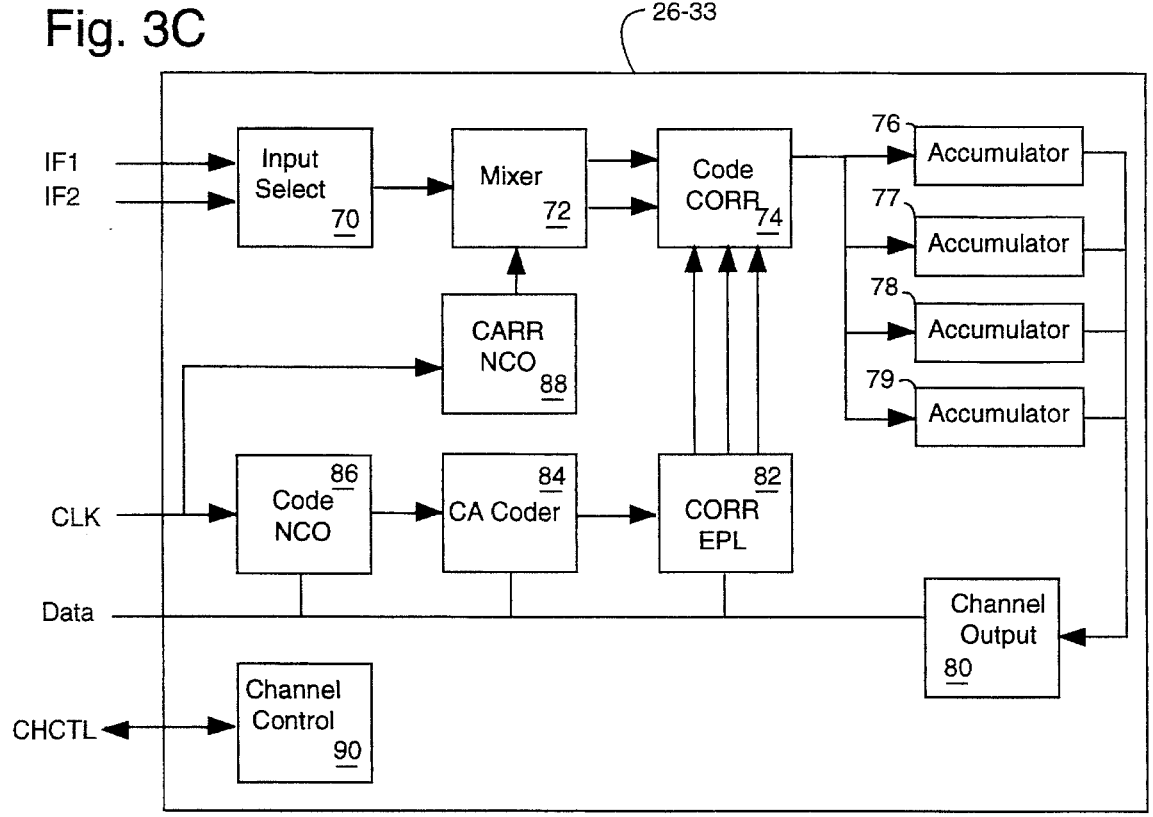
FIGS. 3A–3C are block diagrams of the CPU, global controller and a representative one of the eight channels included in the GPS digital integrated circuit of FIG. 1.
Figure 3A:
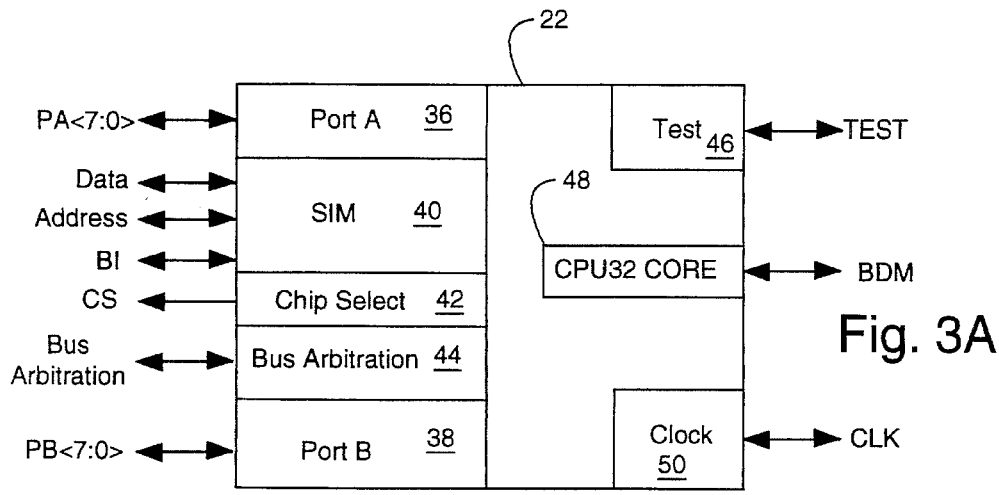

FIG. 3A shows CPU 22 comprises a pair of input/output (I/O) ports ("A" and "B") 36 and 38, a system interface module (SIM) 40 for data and address buses, a chip select 42 for controlling peripherals such as DUART 16, a bus arbiter 44, a test interface 46, a CPU interface 48 and a clock circuit 50.

Figure 3B:
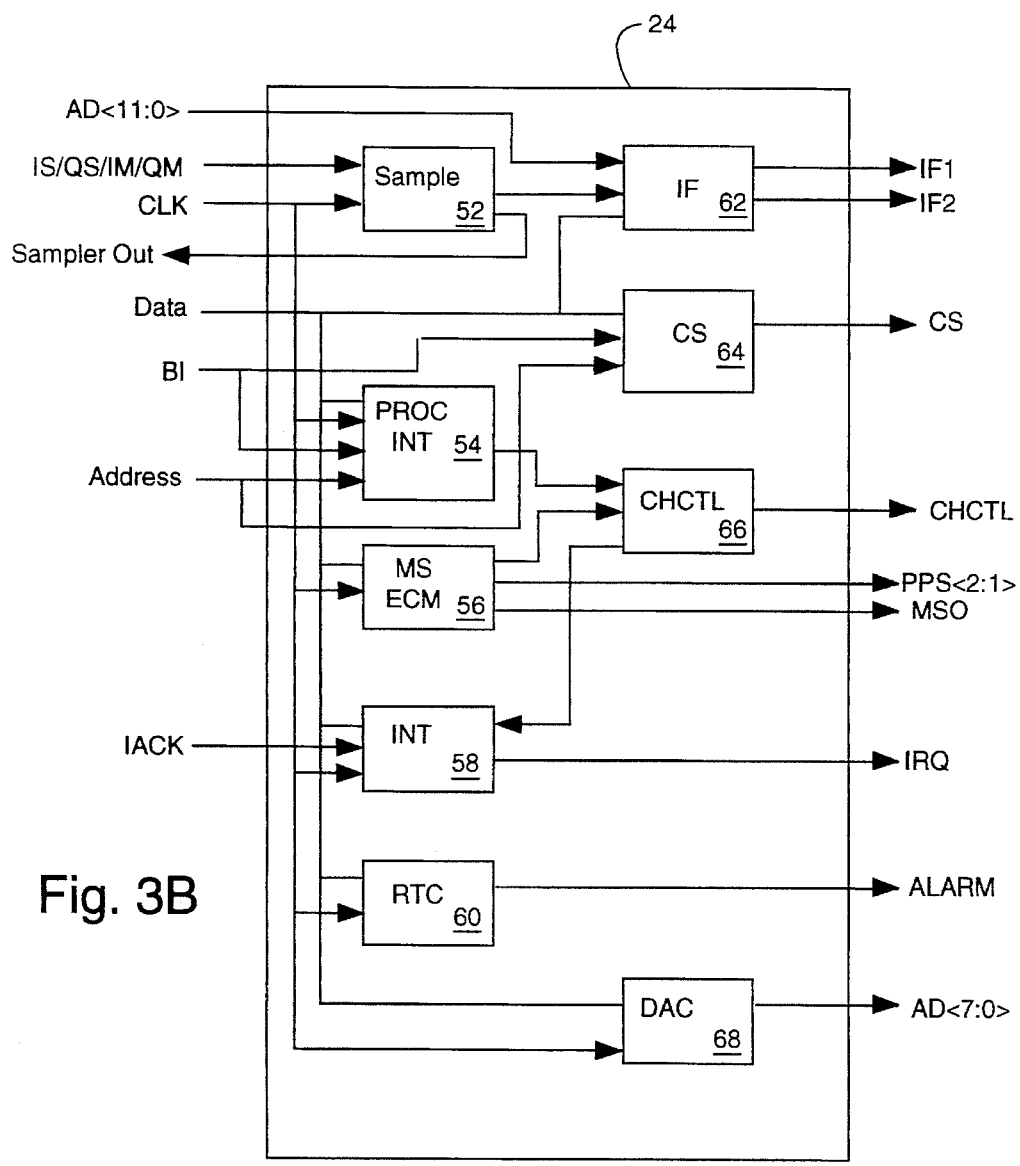

FIG. 3B illustrates global controller 24 which comprises a sample circuit 52 for intermediate frequency (IF) demodulation, a process interrupt circuit 54, a millisecond event counter 56, an interrupt generator 58, a real time clock (RTC) 60, an IF input selector 62, a chip select (CS) 64, a channel controller 66 and a digital-to-analog converter (DAC) 68 that is used in a distributed implementation of a synchronized analog-to-digital converter for inputs AD(11-0) (Table III).

A typical one of GPS receiver channels 26–33 is shown in FIG. 3C, which each comprise an input selector 70, a mixer 72, a code correlator 74, a set of four accumulators 76–79, a channel output 80, a correlator early-late generator 82, a coarse acquisition (CA) coder 84, a code numerical code oscillator (NCO) 86, a carrier NCO 88 and a channel controller 90.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A digital integrated circuit (IC) for providing digital processing in a global positioning system (GPS) navigation environment, the IC comprising:

a single semiconductor substrate providing for connection to a single power supply voltage;

a microcomputer (CPU) having address and data bus connections to a random access memory (RAM) and a boot-up read only memory (ROM), said microcomputer, said RAM, said ROM, and all of said bus connections being integrated on said substrate and providing acquisition and tracking of navigation satellite transmissions;

a multi-channel GPS receiver including a digital signal processing unit connected to support said acquisition and tracking by the microcomputer and providing satellite navigation including code correlation, position and velocity calculation, said multi-channel GPS receiver being integrated on said substrate; and a peripheral interface providing connection of an analog-to-digital converter (ADC) and a dual universal asynchronous receiver/transmitter (DUART) to the CPU, said peripheral interface, said ADC, and said DUART being integrated on said substrate.

2. An integrated circuit (IC) with a digital signal processor (DSP) for determining a position and velocity of a satellite navigation receiver from radio signals transmitted by orbiting navigation satellites, the DSP comprising:

a single semiconductor chip having a plurality of input/output (I/O) pins for external connections;

a set of IC pin multiplexers fully disposed on the chip and connected to said I/O pins;

a dual universal asynchronous receiver transmitter (DUART) connected to the set of IC pin multiplexers for serial data communications and fully disposed on the chip;

a read only memory (ROM) comprising a boot code program for selecting an external memory having a custom initialization code and fully disposed on the chip;

a random access memory (RAM) mapped in a memory space adjacent to the ROM and fully disposed on the chip;

a microcomputer (CPU) connected to the ROM and the RAM and providing support for GPS navigation digital processing, GPS code correlation and position and velocity calculation, user keyboard and display interfacing, and general input/output functions, and fully disposed on the chip;

a plurality of GPS receiver channels connected to the set of IC pin multiplexers and the CPU for demodulating navigation satellite carrier signals simultaneously received from a plurality of orbiting GPS satellites, and fully disposed on the chip; and a global channel controller connected to the set of IC pin multiplexers and having a sample circuit connected for intermediate frequency (IF) demodulation, a process interrupt circuit connected to the CPU, a millisecond event counter connected to the CPU, an interrupt generator connected to the CPU, a real time clock (RTC) connected to the CPU, an IF input selector connected to the set of IC pin multiplexers, and a channel controller connected to the plurality of GPS receiver channels, and fully disposed on the chip.

3. The IC of claim 2, wherein the microcomputer comprises a thirty-two bit processor and includes master/slave means for disabling the microcomputer means providing operation of the IC as a peripheral during software development with an emulator.

4. The IC of claim 3, wherein:

the CPU includes thirty-two address lines of which a portion are connected directly to an external interface of the IC and another portion are brought to a shared external interface of the IC wherein the number of interface pins required for the IC is conserved.

5. The IC of claim 2, wherein the DUART comprises a communications controller providing request-to-send and clear-to-send communication-interface controls and a crystal oscillator interface for an external crystal input wherein said crystal oscillator provides a basic clock for communication rates of the DUART.

6. The IC of claim 2, wherein the plurality of GPS receiver channels includes eight channels for providing searching and tracking GPS satellites and their respective Doppler influenced carrier signals, and code multiple access code phases.

7. The IC of claim 2, wherein the plurality of GPS receiver channels includes a set of intermediate frequency (IF) inputs for a two-bit quadrature input.

8. The IC of claim 7, wherein the plurality of GPS receiver channels further includes multiplexer means for accepting a plurality of types of IF signal inputs.

9. The IC of claim 7, wherein the plurality of GPS receiver channels further includes mode-changing means for accepting a plurality of types of IF signal inputs, and wherein:

in a normal mode, said IF inputs are directly available;

in a sampler mode, said IF inputs are directed to a sampler circuit;

in a gyro mode, a pair of single-bit inputs are steered to said sampler circuit and a pair of additional inputs connect to a pair of gyro sampler flip-flops; and in a signed/magnitude input mode, a sign input and two magnitude inputs to said sampler are accepted, together with a sampler clock.

10. The IC of claim 2, wherein:

the chip is substantially square and has:

disposed generally in a first quadrant a system integration module (SIM) and pin multiplexer interface for connection of the IC to external devices;

disposed generally in a second quadrant the CPU coupled to said SIM and pin multiplexer interface;

disposed generally in a third quadrant said GPS receiver coupled to the CPU; and disposed generally in a fourth quadrant the peripheral means and said RAM and ROM coupled to the CPU .

11. The IC of claim 2, further comprising:

power-saving means connected to the plurality of GPS receiver channels and for turning-off the clock signal to a variable number of said channels.

* * * * *